US008844924B2

(12) United States Patent
Kawauchi (10) Patent No.: US 8,844,924 B2
(45) Date of Patent: Sep. 30, 2014

(54) SHEET FEEDING DEVICES, IMAGE READING DEVICES AND IMAGE FORMING DEVICES (75) Inventor: Yoshikazu Kawauchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/360,852

(22) Filed: Jan. 30, 2012

(65) Prior Publication Data

US 2012/0248686 A1 Oct. 4, 2012

(30) Foreign Application Priority Data

Mar. 29, 2011 (JP) ................................. 2011-071337

(51) Int. Cl.
*B65H 1/04* (2006.01)
*B65H 3/06* (2006.01)
*B65H 9/04* (2006.01)
*H04N 1/00* (2006.01)

(52) U.S. Cl.
CPC ............ *H04N 1/0057* (2013.01); *B65H 3/063* (2013.01); *B65H 2801/06* (2013.01); *B65H 2701/1315* (2013.01); *B65H 9/04* (2013.01); *B65H 2511/12* (2013.01); *B65H 2405/1111* (2013.01); *B65H 2405/11152* (2013.01); *H04N 1/00602* (2013.01)
USPC ........................................ 271/171; 271/240

(58) Field of Classification Search
USPC .................................. 271/171, 240
See application file for complete search history.

(56) References Cited

U.S. PATENT DOCUMENTS

| 4,838,535 | A | * | 6/1989 | Yokoi et al. ..................... 271/22 |
| 5,091,754 | A | * | 2/1992 | Abe et al. ....................... 399/394 |
| 5,927,702 | A | * | 7/1999 | Ishii et al. ..................... 271/9.09 |
| 6,053,491 | A | | 4/2000 | Cheong |
| 6,412,773 | B1 | * | 7/2002 | Takagi ........................... 271/171 |
| 7,578,500 | B2 | * | 8/2009 | Tsuchida ....................... 271/171 |
| 7,770,888 | B2 | * | 8/2010 | Nakamura ..................... 271/171 |
| 2003/0047862 | A1 | | 3/2003 | Komatsu |
| 2007/0222140 | A1 | | 9/2007 | Tsuchida |
| 2011/0176188 | A1 | * | 7/2011 | Tamehira et al. .............. 358/498 |

FOREIGN PATENT DOCUMENTS

| CN | 1184762 A | 6/1998 |
| CN | 1406848 A | 4/2003 |
| JP | 5-43059 | 2/1993 |
| JP | H07-101562 A | 4/1995 |

(Continued)

OTHER PUBLICATIONS

Notification of Reasons for Rejection issued in corresponding Japanese Patent Application No. 2011-071337 mailed Jul. 23, 2013.

(Continued)

*Primary Examiner* — Luis A Gonzalez
(74) *Attorney, Agent, or Firm* — Banner & Witcoff, Ltd.

(57) ABSTRACT

A sheet feeding device configured to feed sheets, the sheet feeding device including a tray configured to receive the sheets; a separation portion configured to separate the sheets one by one; a guide portion configured to guide feeding of the sheets while regulating a position of the sheets in a width direction that is orthogonal to a feed direction of the sheets, the guide portion comprising an upstream side end portion, in the feed direction of the sheets, which is disposed above the tray and a downstream side end portion, in the feed direction, which extends further to the downstream side, in the feed direction, than the separation portion.

9 Claims, 9 Drawing Sheets

(56) References Cited

FOREIGN PATENT DOCUMENTS

| | | |
|---|---|---|
| JP | 10-029730 A | 2/1998 |
| JP | 10-279086 A | 10/1998 |
| JP | 2001-139156 A | 5/2001 |
| JP | 2003-81475 | 3/2003 |
| JP | 2003-081475 A | 3/2003 |
| JP | 2003-237971 A | 8/2003 |
| JP | 2007-261694 A | 10/2007 |
| JP | 2009-274858 A | 11/2009 |

OTHER PUBLICATIONS

Decision on Rejection issued in Japanese Patent Application No. 2011-071337 mailed Mar. 18, 2014.

First Office Action issued in corresponding Chinese Application No. 201210021904.3 mailed May 15, 2014.

* cited by examiner

SHEET FEEDING DEVICES, IMAGE READING DEVICES AND IMAGE FORMING DEVICES

CROSS-REFERENCE TO RELATED APPLICATION

This Application claims priority from JP2011-071337, filed on Mar. 29, 2011, the disclosure of which is hereby incorporated by reference.

BACKGROUND

The present disclosure relates to a sheet feeding device, an image reading device and an image forming device.

Document reading devices, such as scanners etc., are provided with a sheet feeding device, known as an Auto Document Feeder (ADF), which feeds a plurality of sheets one at a time, and automatically supplies each sheet to a reading position. A document feeder is provided with a tray, a separation portion, and a feed roller. Documents are placed in the tray. The separation portion includes a separation roller and a separation pad. The feed roller feeds separated documents to a reading position, one at a time. The separation roller and the separation pad separate the documents fed from the tray one by one. The tray is provided with a guide portion. The guide portion slides in a transverse direction of the documents, namely in a direction that is orthogonal to a feed direction of the documents in the tray. The guide portion inhibits skewing of the documents by restricting both sides of the documents that are fed out from the tray.

The guide portion of the document feeder that is described above extends from the tray to a position in front of the separation roller. By the extension of the guide portion of the document feeder, it is possible to reduce a possibility of members between the tray and the position in front of the separation roller from causing skewing.

SUMMARY

However, the guide portion of the document feeder that is described above only has a length from the tray to immediately in front of the separation roller. Factors causing skewing of the document can include members other than those disposed from the tray to immediately in front of the separation roller. Tilting of the separation roller and a conveyance roller, variations in wear in the width direction of the separation roller or the conveyance roller, or variations in nip pressure in the width direction of the separation pad etc. cause skewing of the document. As a result, there is a problem in which skewing of the document after separation of the sheet cannot be suppressed. In order to reduce a possibility of skewing occurring after separation of the sheet, a method is conceivable, for example, in which a plurality of the separation rollers are provided in the width direction. However, when such a method is used, an increase in components and in costs is incurred. Thus, the problem still remains that the possibility of skewing of the document after separation of the sheet cannot be reduced.

It is an object of the present disclosure to provide a sheet feeding device, an image reading device, and an image forming device that are capable of suppressing skewing after separation of a sheet.

In an aspect of the disclosure, a sheet feeding device configured to feed sheets, the sheet feeding device comprising: a tray configured to receive the sheets; a separation portion configured to separate the sheets one by one; a guide portion configured to guide feeding of the sheets while regulating a position of the sheets in a width direction that is orthogonal to a feed direction of the sheets, the guide portion comprising an upstream side end portion, in the feed direction of the sheets, which is disposed above the tray and a downstream side end portion, in the feed direction, which extends further to the downstream side, in the feed direction, than the separation portion.

In an another aspect of the disclosure, an image reading device includes the above-described sheet feeding device; and a reading portion that reads an image on the sheet that is fed by the sheet feeding device.

In an another aspect of the disclosure, an image forming device includes the above-described image reading device; and an image forming portion that performs image forming onto a recording medium, based on the image read by the reading portion.

BRIEF DESCRIPTION OF THE DRAWINGS

Exemplary embodiments of the disclosure will be described below in detail with reference to the accompanying drawings in which.

DETAILED DESCRIPTION

Figure 1:
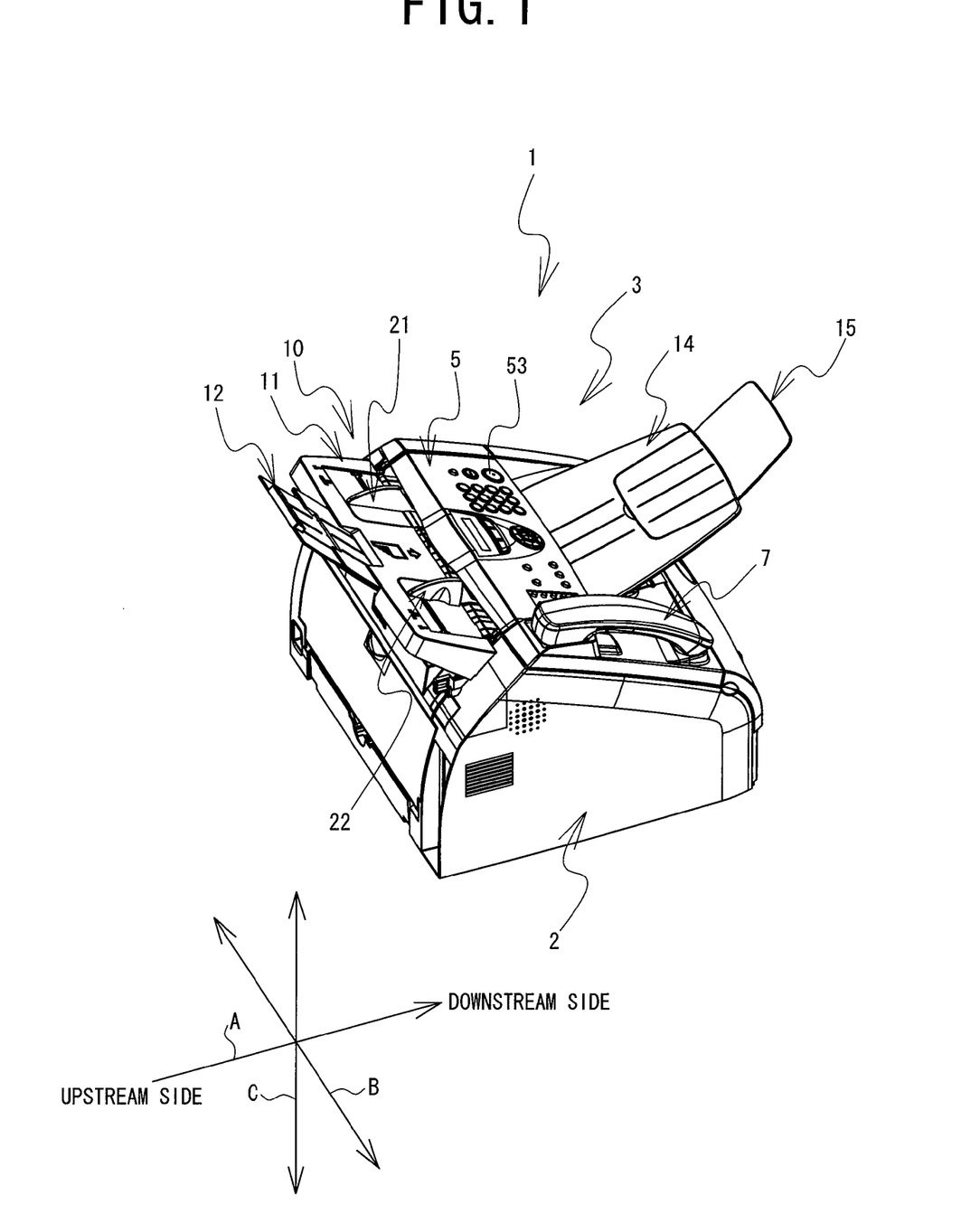
FIG. 1 is a perspective view of a multifunction machine 1 that is an embodiment of the present disclosure.

Hereinafter, a multifunction machine 1 that is an embodiment of the present disclosure will be explained with reference to the drawings. The drawings that are referred to are used to explain technical features that the present disclosure can adopt. A device configuration and the like that are shown in the drawings are simply explanatory examples and do not limit the present disclosure to only those examples. In the explanation below, as shown in FIG. 1, the upper right side, the lower left side, the upper left side, and the lower right side of FIG. 1 and FIG. 2 respectively correspond to the front, the rear, the right side, and the left side of the multifunction machine 1. The right side, the left side, the depth direction, and the front direction of FIG. 4 correspond to the front, the rear, the right side, and the left side of the multifunction machine 1. In FIG. 1, a direction in which a sheet is fed from the rear toward the front is a feed direction (a direction A in FIG. 1). In FIG. 1, on a surface of the sheet, a direction that is orthogonal to the feed direction of the sheet is a width direction (a direction B in FIG. 1). In FIG. 1, a direction that is orthogonal to the sheet surface is a height direction (a direction C in FIG. 1). In FIG. 1, the direction to the rear of the feed direction is an upstream direction and a direction to the front of the feed direction is a downstream direction.

A configuration of the multifunction machine 1 will be explained with reference to FIG. 1. The multifunction machine 1 is a multi-functional device that is provided with a telephone function, a printer function, a scanner function, a copy function, a facsimile function and so on. An image reading device 3 that reads out an image on a sheet is provided in an upper portion of a main body 2 of the multifunction machine 1. The image reading device 3 is provided inside the main body 2. The image reading device 3 is provided with a reading portion 8 (refer to FIG. 4) that reads the image formed on a surface of the sheet, and an automatic document feeder 10 (hereinafter referred to as ADF 10), which supplies the sheet to the reading portion 8.

The multifunction machine 1 is provided with a paper feed tray 11, an extension guide 12, a paper output tray 14, and an extension guide 15. As shown in FIG. 1, the paper feed tray 11 is provided on the rear side of the upper portion of the main body 2. The paper feed tray 11 inclines gradually from the front to the rear. The paper feed tray 11 is a flat plate-shaped tray on which sheets are placed. The extension guide 12 is provided extending upward from a central portion in the width direction of an upper edge portion of the paper feed tray 11. The extension guide 12 is a flat plate-shaped guide that can expand and contract in the feed direction. The paper output tray 14 is provided on the front of the main body 2. The paper output tray 14 inclines diagonally upward from the rear to the front. The paper output tray 14 is a flat plate-shaped tray on which sheets that have been read by the reading portion 8 are ejected. The extension guide 15 is provided extending upward from a central portion in the width direction of an upper edge portion of the paper output tray 14.

The multifunction machine 1 is provided with an operation panel 5 and a telephone receiver 7. Due to maintenance considerations, the operation panel 5 is removably provided between the paper feed tray 11 and the paper output tray 14 on the upper portion of the main body 2. The operation panel 5 has a substantially rectangular shape in a planar view and is used to operate the multifunction machine 1. The telephone receiver 7 is provided immediately to the left of the operation panel 5. If an operator presses a start button 53 on the operation panel 5, for example, the ADF 10 of the image reading device 3 feeds, to the reading portion 8, sheets that are received by the paper feed tray 11. The ADF 10 feeds the sheets one at a time. An image on the sheet that has been read by the reading portion 8 is stored in a memory (not shown in the drawings) inside the main body 2. The sheet having the image that has been read by the reading portion 8 is ejected to the paper output tray 14.

Figure 4:
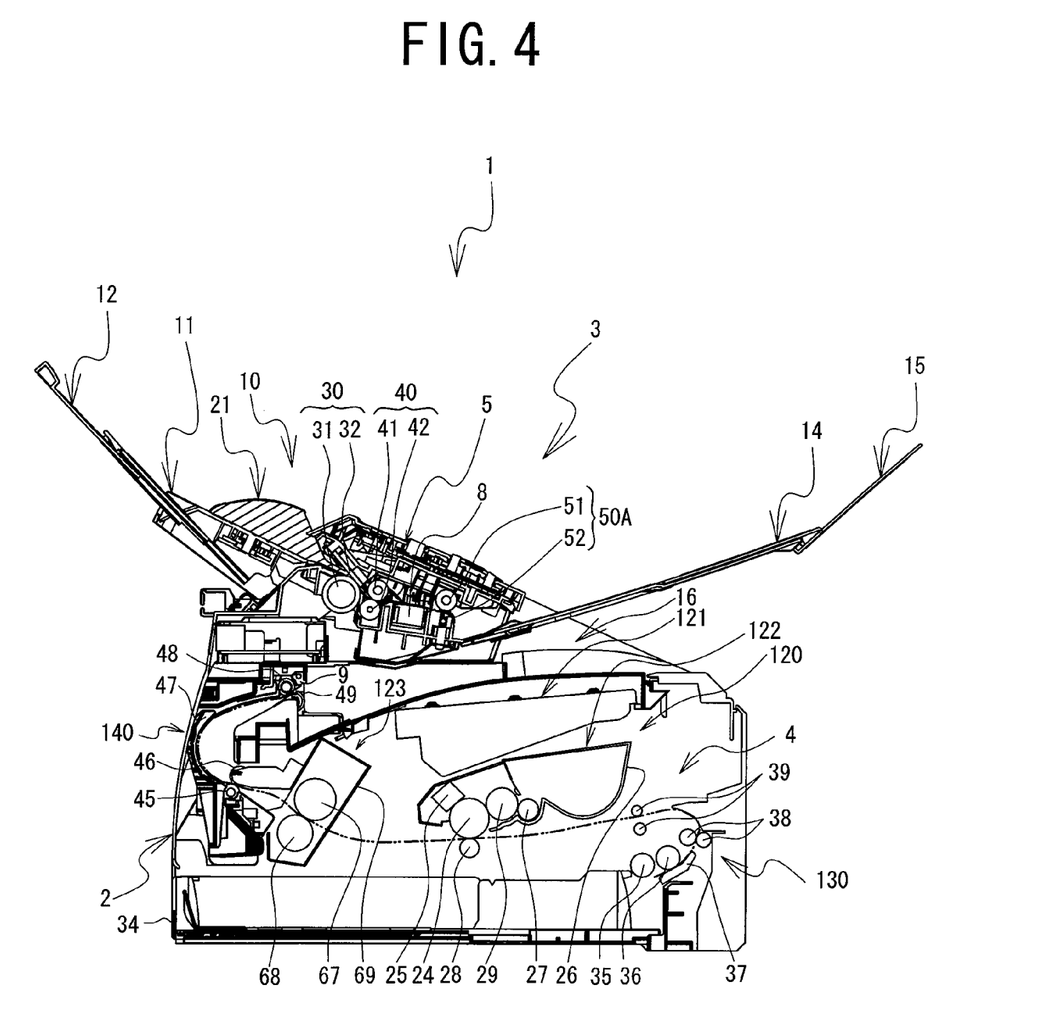
FIG. 4 is a cross-sectional view along a front-rear direction of the multifunction machine 1 shown in FIG. 1.

As shown in FIG. 4, the multifunction machine 1 is provided with a printing portion 4 inside the main body 2. The printing portion 4 transfers a developer image onto a recording medium such as paper (hereinafter referred to as printing paper) and forms an image. The main body 2 is provided with a paper ejecting portion 16. The paper ejecting portion 16 is provided underneath the paper output tray 14 on the upper portion of the main body 2. The paper ejecting portion 16 receives the printing paper on which the image has been formed by the printing portion 4.

The printing portion 4 includes an image forming portion 120, a feeder portion 130, a conveyance unit 140, and so on. The image forming portion 120 forms the image stored in the memory (not shown in the drawings) of the multifunction machine 1 onto the printing paper. The image formed on the printing paper is the image that has been read by the reading portion 8. The feeder portion 130 supplies the printing paper to the image forming portion 120. The conveyance unit 140 turns the printing paper, on which the image forming by the image forming portion 120 is complete, by substantially 180 degrees in the upward direction, and feeds the rotated printing paper to the paper ejecting portion 16.

As shown in FIG. 4, the feeder portion 130 is provided with a paper feed tray 34, a paper feed roller 35, a separation roller 36 and a separation pad 37, a pair of conveyance rollers 38, and a pair of resist rollers 39. The paper feed tray 34 is removably attached to a lowermost portion of the main body 2. The paper feed roller 35 is provided on top of a front end portion of the paper feed tray 34, and feeds the printing paper to the image forming portion 120. The separation roller 36 and the separation pad 37 separate out the printing paper fed by the paper feed roller 35 into individual sheets.

The pair of conveyance rollers 38 are provided further on a downstream side from the separation roller 36, in the printing paper feed direction. The pair of conveyance rollers 38 feed the printing paper fed by the paper feed roller 35 toward the image forming portion 120. The pair of resist rollers 39 are provided on an input side of the image forming portion 120. The pair of resist rollers 39 apply a predetermined feed resistance to the printing paper being fed and thus regulate a feed state of the printing paper.

The image forming portion 120 is provided with an exposure device 121, a developing device 122, and a fuser 123 etc. The exposure device 121 is provided on an uppermost portion inside the main body 2. The image forming portion 120 is provided with a laser light source, a polygon mirror, an fθ lens, and a reflecting mirror etc., which are not shown in the drawings. The image forming portion 120 forms an electrostatic latent image on a top surface of a photoconductive drum 24, which will be explained later.

The developing device 122 is removably housed inside the main body 2, below the exposure device 121. The developing device 122 is provided with the photoconductive drum 24, an electrifier 25, and a developer holding portion 26. The photoconductive drum 24 temporarily holds the developer image that is transferred onto the printing paper. The electrifier 25 electrifies the top surface of the photoconductive drum 24. The developer holding portion 26 holds developer. A feed roller 27 and a developing roller 29 are provided between the developer holding portion 26 and the photoconductive drum 24. The feed roller 27 and the developing roller 29 feed the developer taken out from the developer holding portion 26 to the photoconductive drum 24.

The developer that has been taken out of the developer holding portion 26 is fed to the developing roller 29 side by rotation of the feed roller 27. After the developer that has been fed to the developing roller 29 side is temporarily held on the surface of the developing roller 29, it is fed to the top surface of the photoconductive drum 24, which has been exposed to light by the exposure device 121. A transfer roller 28 is provided in a position facing the photoconductive drum 24 such that the transfer roller 28 and the photoconductive drum 24 sandwich the printing paper that is being fed. The transfer roller 28 carries an electrical charge that is the opposite of the electrical charge with which the photoconductive drum 24 has been electrified. The transfer roller 28 rotates synchronously with the photoconductive drum 24. The developer image generated on the surface of the photoconductive drum 24 is transferred onto a printing surface of the printing paper.

The fuser 123 is provided with a heating roller 67, a pressure roller 68, and a casing 69 etc. The heating roller 67 heats the developer image that is disposed on the side of the printing surface of the printing paper. The pressure roller 68 is provided on an opposite side to the heating roller 67, such that the pressure roller 68 and the heating roller 67 sandwich the printing paper, and the pressure roller 68 presses the printing paper to the heating roller 67 side. The casing 69 houses the heating roller 67 and the pressure roller 68.

The conveyance unit 140 is provided on the downstream side with respect to the fuser 123, in the printing paper feed direction. The conveyance unit 140 forms a feed passage that is substantially U-shaped and that runs from the fuser 123 to an ejection opening 9 side. The conveyance unit 140 is provided with a pair of conveyance rollers 45 and 46, a turning guide 47, and a pair of ejecting rollers 48 and 49 etc.

The conveyance rollers 45 and 46 come into contact with the printing paper ejected from the fuser 123 and feed the printing paper by rotating. The turning guide 47 is provided further on the downstream side than the conveyance rollers 45 and 46, in the feed direction. The turning guide 47 is provided on a loop back portion of the feed passage that is bent in the substantially U shape. The turning guide 47 turns the feed direction of the printing paper ejected from the conveyance rollers 45 and 46 by approximately 180 degrees in the upward direction. The ejecting rollers 48 and 49 are provided on the ejection opening 9 side on the feed passage. The ejecting rollers 48 and 49 eject the printing paper to the paper ejecting portion 16.

Figure 2:
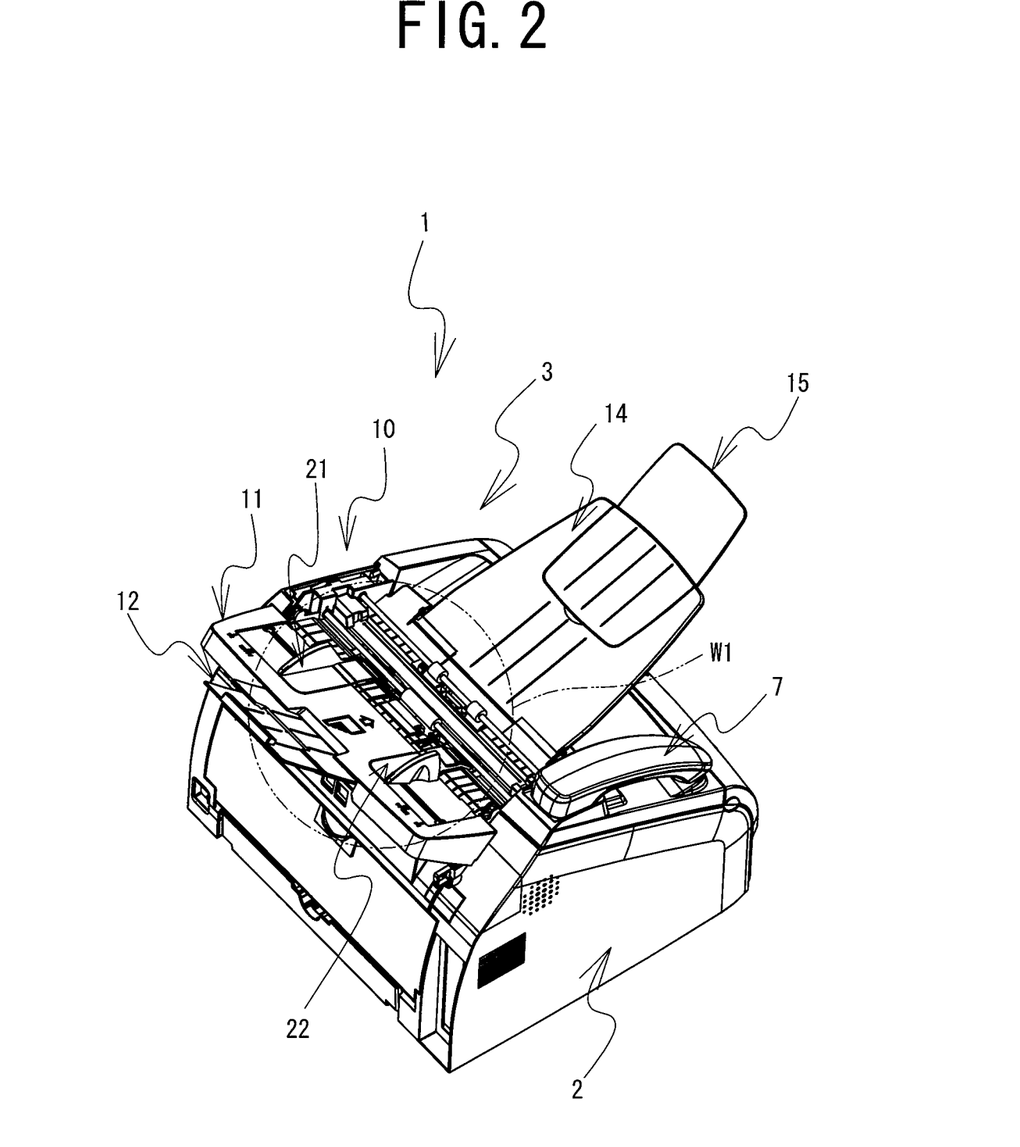
FIG. 2 is a perspective view of a state in which an operation panel 5 is removed from the multifunction machine 1.
Figure 3:
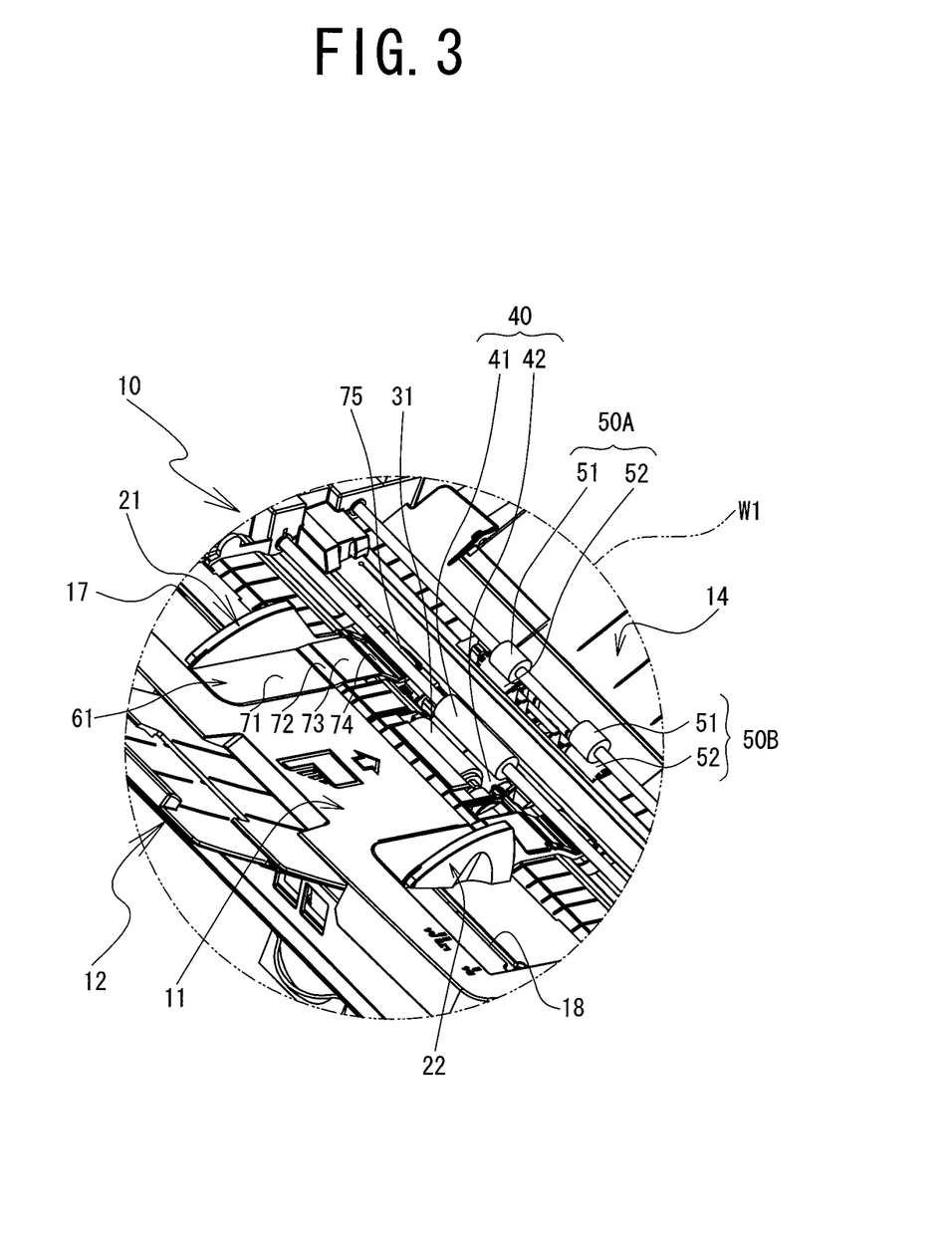
FIG. 3 is a partial enlarged view inside an area of the multifunction machine 1 that is enclosed by a broken line W1 in FIG. 2.

The multifunction machine 1 is provided with a pair of sheet guides 21 and 22, a groove 17, and a groove 18. As shown in FIG. 1 and FIG. 2, the pair of sheet guides 21 and 22 are provided on a sheet placement surface of the paper feed tray 11, on the downstream side in the feed direction of the sheet. The pair of sheet guides 21 and 22 regulate, in the width direction, a position of the sheet placed on the paper feed tray 11. As shown in FIG. 3, the groove 17 is provided in a right side region of the placement surface of the paper feed tray 11, on the downstream side in the feed direction of the sheet. The groove 17 runs parallel to the width direction of the paper feed tray 11. The groove 18 is provided on the left side of the placement surface of the paper feed tray 11 on the downstream side in the feed direction of the sheet. The groove 18 runs parallel to the width direction of the paper feed tray 11. The sheet guide 21 is engaged with the groove 17 and can move in the width direction along the groove 17. The sheet guide 22 is engaged with the groove 18 and can move in the width direction along the groove 18.

The pair of sheet guides 21 and 22 are coupled with each other by a gear mechanism (not shown in the drawings) that is provided inside the main body 2. For example, when the sheet guide 21 is manually moved from the right side of the paper feed tray 11 toward the center of the paper feed tray 11, the sheet guide 22 also moves in conjunction with the movement of the sheet guide 21, from the left side to the center of the paper feed tray 11. Conversely, when the sheet guide 21 is manually moved from the center to the right side of the paper feed tray 11, the sheet guide 22 also moves in conjunction with the movement of the sheet guide 21, from the center to the left side of the paper feed tray 11. By this linked movement, the sheet guides 21 and 22 can easily and rapidly align, in the width direction, both edges of the sheet that is placed on the paper feed tray 11 and the sheet can also reliably be set in the center of the paper feed tray 11 in the width direction.

As shown in FIG. 1 and FIG. 2, the operation panel 5 can be removed from the main body 2. As shown in FIG. 2, when the operation panel 5 is removed from the main body 2, the various roller components forming the ADF 10 are exposed in the upper portion of the main body 2.

The multifunction machine 1 is provided with a separation roller 31, a conveyance roller 41, a pinch roller 42, and ejecting portions 50A and 50B. As shown in FIG. 3, in the upper portion of the main body 2, the separation roller 31 is provided in the vicinity of the downstream side of the paper feed tray 11, in the feed direction of the sheet. The conveyance roller 41 and the pinch roller 42 are respectively provided further on the downstream side of the separation roller 31. The ejecting portions 50A and 50B are respectively provided further on the downstream side of the conveyance roller 41 and the pinch roller 42. The ejecting portions 50A and 50B are provided with a clearance between them in the left-right direction, on the main body 2, respectively. The ejecting portions 50A and 50B are each formed of a pair of an ejecting roller 51 and a pinch roller 52. The ejecting roller 51 and the pinch roller 52 face each other in the up-down direction.

A structure of the ADF 10 will be explained. As shown in FIG. 4, the ADF 10 is provided with the paper feed tray 11, the sheet guides 21 and 22, a separation portion 30, and a conveyance portion 40. The sheet guides 21 and 22 are provided on the paper feed tray 11 such that they partially overlap. The separation portion 30 is provided on the downstream side of the paper feed tray 11, in the feed direction of the sheet. The separation portion 30 separates the sheets placed on the paper feed tray 11 and feeds the sheets one by one. The conveyance portion 40 is provided on the downstream side of the separation portion 30. The conveyance portion 40 transports the sheet separated by the separation portion 30 toward the reading portion 8.

Figure 5:
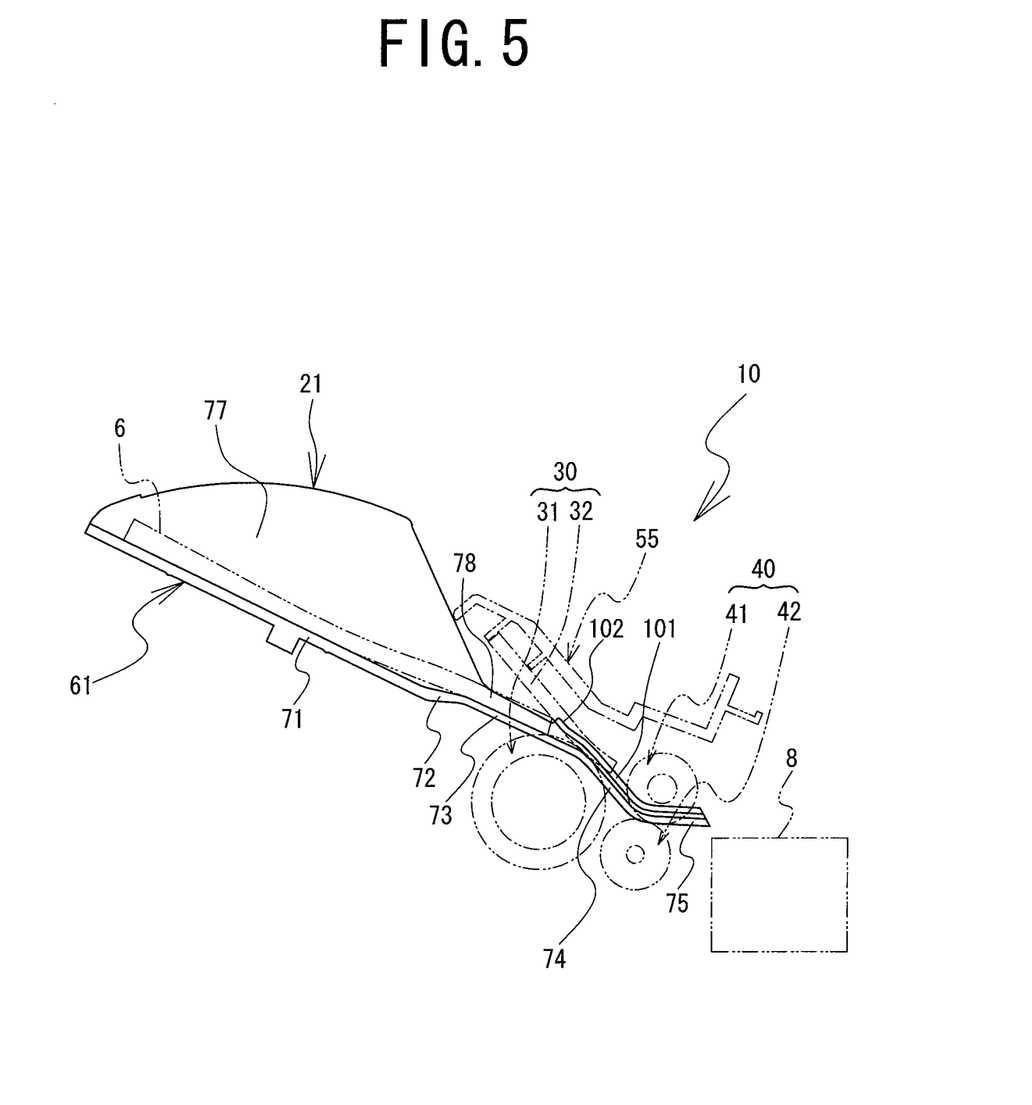
FIG. 5 is a diagram showing positional relationships between a sheet guide 21 and various rollers of the multifunction machine 1.

As shown in FIG. 4 and FIG. 5, the separation portion 30 is provided with a separation pad 32 and a separation roller 31. The separation portion 30 is fixed by a fixing member 55 that is provided on a rear surface of the operation panel 5 and that is shown in FIG. 5. The separation pad 32 comes into contact with an upper surface of an uppermost sheet of a sheet bundle 6, which is formed of a plurality of the sheets loaded on the paper feed tray 11, and applies a predetermined feed resistance to the sheet. By rotating while pushing the sheet against the separation pad 32, the separation roller 31 separates the sheet one at a time in order from the sheet positioned lowermost, and feeds the sheet. It should be noted that there are cases in which the sheets are not fully separated one by one by the separation portion 30. However, even in this case, the plurality of sheets can be separated to a certain extent into a fewer number of sheets. Hereinafter, separating the sheets one by one or separating the sheets to a certain extent into a fewer number of sheets will be referred to as "separating the sheet." The separation roller 31 is driven by a driving source (not shown in the drawings) that supplies a driving force to the separation roller 31. The conveyance portion 40 is provided with the conveyance roller 41 and the pinch roller 42. The conveyance roller 41 comes into contact with the upper surface of the sheet separated out by the separation portion 30 and applies a conveyance force to the sheet. The pinch roller 42 pushes the sheet from below toward the conveyance roller 41.

The ejecting portions 50A and 50B will be explained. As shown in FIG. 3 and FIG. 4, the ejecting portions 50A and 50B are each provided with the ejecting roller 51 and the pinch roller 52. The ejecting roller 51 comes into contact with the upper surface of the sheet that has been read by the reading portion 8, and ejects the sheet toward the paper output tray 14. The pinch roller 52 pushes the sheet from below toward the ejecting roller 51. The ejecting roller 51 is driven by a driving source that is not shown in the drawings. The ejecting roller 51 is synchronously driven with the separation roller 31 and the conveyance roller 41. Due to the synchronous driving, it is possible to favorably perform a series of operations in which the sheets placed on the paper feed tray 11 are separated and fed one by one and conveyed to the reading portion 8, and then the sheet that is read by the reading portion 8 is ejected to the paper output tray 14.

The shape of the feed passage of the sheet from the paper feed tray 11 to the reading portion 8 in the ADF 10 will be explained. As shown in FIG. 5, the feed passage of the ADF 10 is bent in the downward direction with respect to the feed direction, taking as a boundary a nip point where the separation roller 31 and the separation pad 32 come into contact with each other. Further, the feed passage of the ADF 10 is once more bent back, diagonally upward, taking the conveyance roller 41 and the pinch roller 42 as a boundary. By bending the feed passage up and down in this way with respect to the feed direction, even if the feed passage of the sheet is long, the length of the multifunction machine 1 in the front-rear direction can be compactly formed. In the present embodiment, the shape of the sheet guides 21 and 22, which will be explained later, corresponds to the shape of the bending of the feed passage of the ADF 10.

Figure 6:
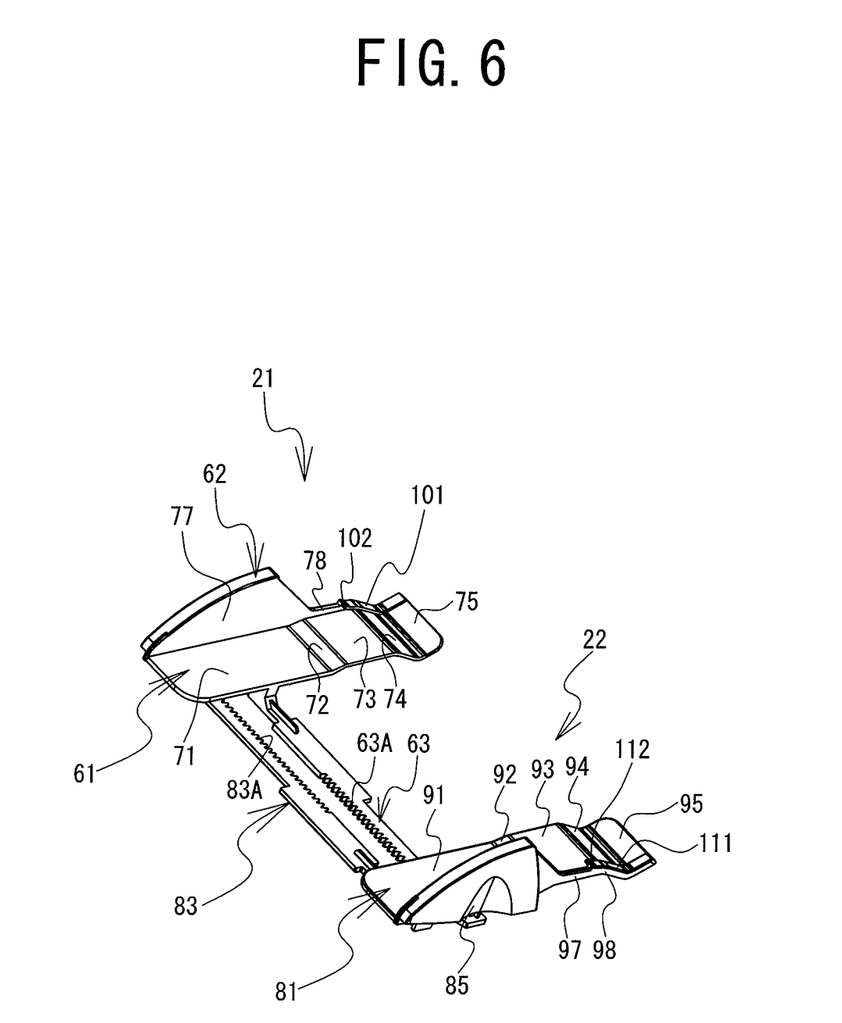
FIG. 6 is a perspective view of a state in which the sheet guide 21 and a sheet guide 22 of the multifunction machine 1 are linked.

The sheet guides 21 and 22 will be explained. As shown in FIG. 6, the sheet guides 21 and 22 are flat plate members having a substantially L shape as seen from the feed direction. The sheet guides 21 and 22 have a shape with bilateral symmetry in the left-right direction. By sandwiching the sheet placed on the paper feed tray 11 shown in FIG. 4 from both sides in the width direction, the sheet guides 21 and 22 regulate the position of the sheet in the width direction and guide the feeding of the sheet to the reading portion 8 shown in FIG. 4. Hereinafter, the shape of each of the guides will be individually explained.

Figure 7:
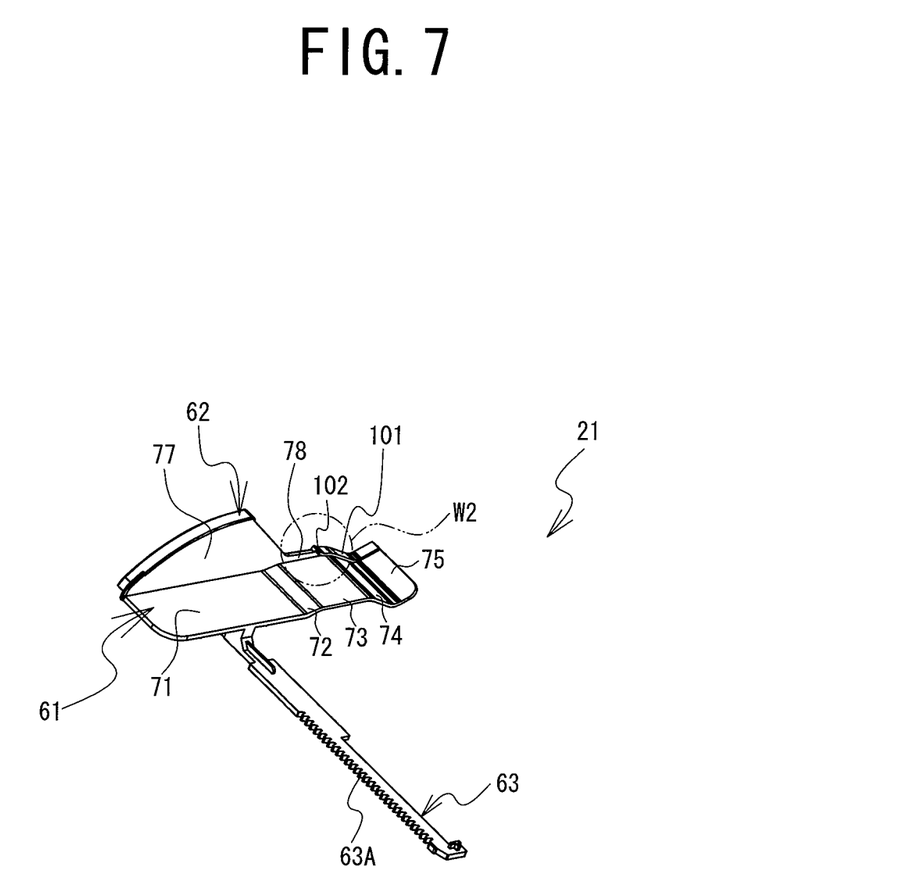
FIG. 7 is a perspective view of the sheet guide 21.

The shape of the sheet guide 21 will be explained. The sheet guide 21 is provided with a placement portion 61, a wall portion 62, and an extending portion 63. As shown in FIG. 7, the placement portion 61 has a rectangular shape that extends from the front toward the rear. The wall portion 62 is provided substantially vertically on one end portion of the right side of the placement portion 61. The extending portion 63 extends in a direction orthogonal to the feed direction from a substantially central portion of the placement portion 61 in the feed direction, and extends in a direction opposite to the wall portion 62 side.

The placement portion 61 supports, from below, a right edge of an underside surface of the sheet. The placement portion 61 is provided, in order from the upstream side in the direction in which the sheet is fed, with a first placement portion 71, a second placement portion 72, a third placement portion 73, a fourth placement portion 74, and a fifth placement portion 75. The first placement portion 71 extends in the feed direction of the sheet. The second placement portion 72 is connected to an end portion of the first placement portion 71 on the downstream side. The second placement portion 72 tilts diagonally upward with respect to an upper surface of the first placement portion 71. The third placement portion 73 is connected to an end portion of the second placement portion 72 on the downstream side. The third placement portion 73 has a surface that is parallel to the upper surface of the first placement portion 71. The fourth placement portion 74 is connected to an end portion of the third placement portion 73 on the downstream side. The fourth placement portion 74 tilts diagonally downward with respect to an upper surface of the third placement portion 73. The fifth placement portion 75 is connected to an end portion of the fourth placement portion 74 on the downstream side. The fifth placement portion 75 is provided extending diagonally upward with respect to an upper surface of the fourth placement portion 74. The placement portion 61 bends up and down at each of connecting portions between the first placement portion 71, the second placement portion 72, the third placement portion 73, the fourth placement portion 74, and the fifth placement portion 75. The curved shape of the placement portion 61 corresponds to the feed passage that bends up and down of the ADF 10.

The wall portion 62 regulates the position of the right edge of the sheet by coming into contact, from the right side, with the right edge of the sheet. The wall portion 62 is provided with a first wall portion 77 and a second wall portion 78. The first wall portion 77 is a right edge portion of the placement portion 61, and is provided on a section corresponding to the first placement portion 71 and the second placement portion 72. When seen from the width direction, the first wall portion 77 has a substantially triangular shape that gradually expands toward the right side from the upstream side to the downstream side in the feed direction of the sheet. The second wall portion 78 is provided in a section corresponding to the third placement portion 73, the fourth placement portion 74, and the fifth placement portion 75. A size of the second wall portion 78 in the height direction is smaller than a size of the first wall portion 77 in the height direction. When seen from the width direction, the second wall portion 78 has a horizontally long rectangular shape. A V-shaped notched portion (not shown in the drawings) is provided in a surface on the right side of the first wall portion 77 in the width direction. When a user slides the sheet guide 21 in the width direction of the sheet, the user hooks his or her finger into the V-shaped notched portion.

As shown in FIG. 7 etc., the sheet guide 21 is provided with an upper surface regulating portion 101. The upper surface regulating portion 101 is provided on an upper edge portion of the second wall portion 78, in a section corresponding to the fourth placement portion 74 and the fifth placement portion 75. The upper surface regulating portion 101 protrudes toward the left side, and is provided extending in parallel to the upper surface of the fourth placement portion 74. The upper surface regulating portion 101 regulates the position of the sheet in the height direction, by coming into contact with the upper surface of the sheet that is being guided along the placement portion 61. A height of the upper surface regulating portion 101, namely a distance from an underside surface of the upper surface regulating portion 101 to the upper surface of the fourth placement portion 74, is adjusted to be a height that allows feeding of one of the sheets. As a result, the sheet that has been separated one at a time by the separation portion 30 is favorably guided to the reading portion 8 while its position in both the height direction and the width direction of the sheet is regulated. Note that it is preferable for the height of the upper surface regulating portion 101 to be set such that a paper jam does not occur even if there is multi-feeding of the sheets. As an example of each of dimensions of the upper surface regulating portion 101, it is preferable for a width of protrusion to the right side to be approximately 3 mm and the height to be approximately 2 mm.

Figure 8:
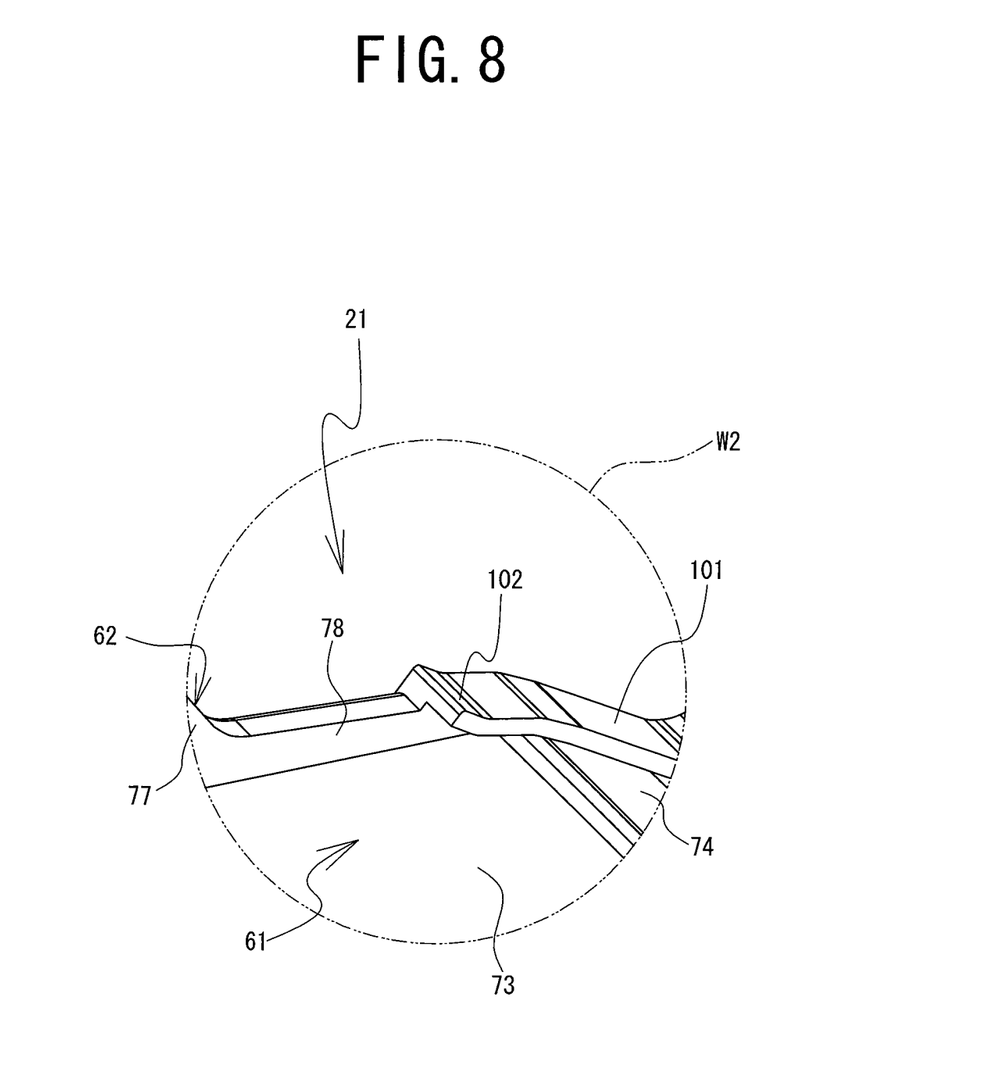
FIG. 8 is a partially enlarged view inside an area of the sheet guide 21 that is enclosed by a broken line W2 in FIG. 7.

As shown in FIG. 5 and FIG. 8, a position of the end portion of the upper surface regulating portion 101 on the upstream side in the feed direction of the sheet reaches up to a section corresponding to the downstream side of the third placement portion 73 in the feed direction of the sheet. An inclined portion 102 is provided on the end portion on the upstream side of the upper surface regulating portion 101. The inclined portion 102 gradually tilts upward from the downstream side toward the upstream side in the feed direction of the sheet, with respect to an extending direction of the upper surface regulating portion 101. The inclined portion 102 functions as an input opening that guides the right edge of the sheet (which has been separated one by one by the separation portion 30) under the upper surface regulating portion 101.

The extending portion 63 is formed as a long and narrow flat plate. The size of the extending portion 63 in the feed direction is smaller than the size of the placement portion 61 in the feed direction. The extending portion 63 is provided with a serrated portion 63A. The serrated portion 63A is provided on one edge of the extending portion 63 that faces toward the upstream side in the feed direction of the sheet. The serrated portion 63A meshes with a gear that is not shown in the drawings, from a center portion, in the width direction, of the one edge of the extending portion 63 to a leading end portion in the width direction. The serrated portion 63A faces, in the feed direction, a serrated portion 83A that is provided on an extending portion 83 (to be described later) of the sheet guide 22.

Figure 9:
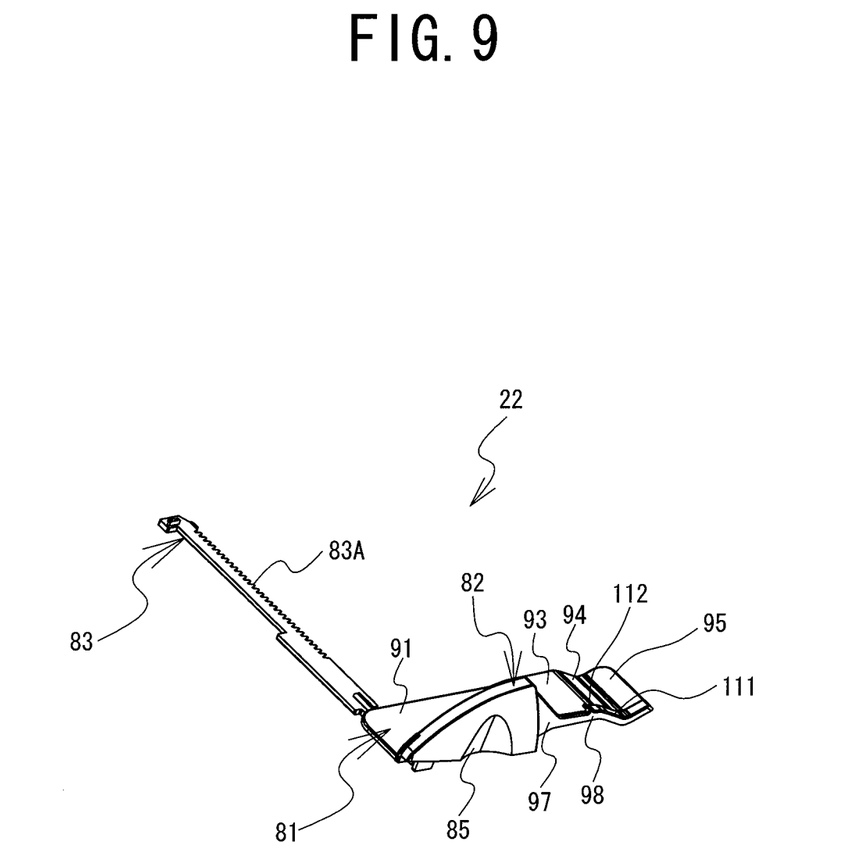
FIG. 9 is a perspective view of the sheet guide 22.

The shape of the sheet guide 22 will be explained. As shown in FIG. 9, the shape of the sheet guide 22 is bilaterally symmetrical with the sheet guide 21. The sheet guide 22 is provided with a placement portion 81, a wall portion 82, and the extending portion 83. The placement portion 81 has a rectangular shape that extends from the front toward the rear. The wall portion 82 is provided substantially vertically on one end portion of the left side of the placement portion 81. The extending portion 83 extends in a direction orthogonal to the feed direction from a substantially central portion of the placement portion 81 in the feed direction, and extends in a direction opposite to the wall portion 82 side.

The placement portion 81 supports, from below, a left edge of the underside surface of the sheet. Similarly to the placement portion 61 of the sheet guide 21, the placement portion 81 is provided, in order from the upstream side in the feed direction, with a first placement portion 91, a second placement portion 92, a third placement portion 93, a fourth placement portion 94 and a fifth placement portion 95, as shown in FIG. 6. The placement portion 81 bends up and down at each of connecting portions between the first placement portion 91, the second placement portion 92, the third placement portion 93, the fourth placement portion 94, and the fifth placement portion 95. The curved shape of the placement portion 81 corresponds to the feed passage that bends up and down of the ADF 10.

The wall portion 82 regulates the position of the left edge of the sheet by coming into contact, from the left side, with the left edge of the sheet. The wall portion 82 is provided with a first wall portion 97 and a second wall portion 98. The first wall portion 97 is a left edge portion of the placement portion 81, and is provided on a section corresponding to the first placement portion 91 and the second placement portion 92. When seen from the width direction, the first wall portion 97 has a substantially triangular shape that gradually expands toward the left side from the upstream side to the downstream side in the feed direction of the sheet. The second wall portion 98 is provided in a section corresponding to the third placement portion 93, the fourth placement portion 94 and the fifth placement portion 95. A size of the second wall portion 98 in the height direction is smaller than a size of the first wall portion 97 in the height direction. When seen from the width direction, the second wall portion 98 has a horizontally long rectangular shape. A V-shaped notched portion 85 is provided in a surface on the left side of the first wall portion 97 in the width direction. When a user slides the sheet guide 22 in the width direction of the sheet, the user hooks his or her finger into the V-shaped notched portion 85.

As shown in FIG. 9 etc., the sheet guide 22 is provided with an upper surface regulating portion 111. The upper surface regulating portion 111 is provided on an upper edge portion of the second wall portion 98, in a section corresponding to the fourth placement portion 94 and the fifth placement portion 95. The upper surface regulating portion 111 protrudes toward the right side, and is provided extending in parallel to the upper surface of the fourth placement portion 94. The upper surface regulating portion 111 regulates the position of the sheet in the height direction, by coming into contact with the upper surface of the sheet that is being guided along the placement portion 81. A height of the upper surface regulating portion 111, namely a distance from an underside surface of the upper surface regulating portion 111 to the upper surface of the fourth placement portion 94, is also adjusted to be a height that allows feeding of one of the sheets. As a result, the sheet that has been separated one at a time by the separation portion 30 is favorably guided to the reading portion 8 while its position in both the height direction and the width direction of the sheet is regulated. Note that it is preferable for the height of the upper surface regulating portion 111 to be set such that a paper jam does not occur even if there is multi-feeding of the sheets. As an example of each of dimensions of the upper surface regulating portion 111, it is preferable for a width of protrusion to the left side to be approximately 3 mm and the height to be approximately 2 mm.

Similarly to the upper surface regulating portion 101 of the sheet guide 21, a position of the end portion of the upper surface regulating portion 111 on the upstream side in the feed direction of the sheet reaches up to a section corresponding to the downstream side of the third placement portion 93 in the feed direction of the sheet. An inclined portion 112 is provided on the end portion on the upstream side of the upper surface regulating portion 111. The inclined portion 112 gradually tilts upward from the downstream side toward the upstream side in the feed direction of the sheet, with respect to an extending direction of the upper surface regulating portion 111. The inclined portion 112 also functions as an input opening that guides the left edge of the sheet (which has been separated one by one by the separation portion 30) under the upper surface regulating portion 111.

Similarly to the extending portion 63 of the sheet guide 21, the extending portion 83 is formed as a long and narrow flat plate, whose size is small in the feed direction. The extending portion 83 is provided with a serrated portion 83A. The serrated portion 83A is provided on one edge of the extending portion 83 that faces toward the downstream side in the feed direction of the sheet. The serrated portion 83A meshes with a gear that is not shown in the drawings, from a center portion, in the width direction, of the one edge of the extending portion 83 to a leading end portion in the width direction. The serrated portion 83A faces, in the feed direction, the serrated portion 63A that is provided on the extending portion 63 of the sheet guide 21.

A linking mechanism of the sheet guides 21 and 22 will be explained. In the multifunction machine 1 shown in FIG. 1 etc., the sheet guides 21 and 22 are disposed in a state shown in FIG. 6. The extending portion 63 of the sheet guide 21 and the extending portion 83 of the sheet guide 22 face each other inside the main body 2 shown in FIG. 1. A gear that is not shown in the drawings is disposed between the extending portion 63 and the extending portion 83. The gear meshes, respectively, with the serrated portion 63A of the extending portion 63 and the serrated portion 83A of the extending portion 83. As described above, the sheet guides 21 and 22 are guided along the grooves 17 and 18 shown in FIG. 3, the grooves 17 and 18 being provided in the top of the paper feed tray 11. With this structure, for example, the sheet guide 21 is moved from the center in the width direction of the sheet to the right side. When this is done, the gear that is meshed with the serrated portion 63A of the extending portion 63 rotates in the counterclockwise direction, as seen from above. Due to the rotation of the gear, the sheet guide 22 is pushed via the extending portion 83 and moves from the center in the width direction of the sheet to the left side. In other words, the sheet guides 21 and 22 move in a direction such that they separate from each other.

In contrast to this, if the sheet guide 21 is moved from the right side in the width direction of the sheet to the center, the gear that is meshed with the serrated portion 63A of the extending portion 63 rotates in the clockwise direction, as seen from above. Due to the rotation of the gear, the sheet guide 22 is pushed via the extending portion 83 and moves from the left side in the width direction of the sheet to the center. In other words, the sheet guides 21 and 22 move in a direction such that they approach each other. In this way, the sheet guide 22 moves in the opposite direction to the movement direction of the sheet guide 21. Thus, the sheet guides 21 and 22 can easily and rapidly align, in the width direction, both the edges of the sheet that is placed on the paper feed tray 11.

Suppressing skewing of the sheet by the guide shape of the sheet guides 21 and 22 will be explained. Note that skew suppression of the sheet depends on the guide shape of both the sheet guides 21 and 22, but, for ease of explanation, the explanation will be made using a positional relationship between the guide shape of the sheet guide 21 and the sheet. As shown in FIG. 3 and FIG. 5, the placement portion 61 of the sheet guide 21 is provided not only with the first placement portion 71 that is positioned on the paper feed tray 11 shown in FIG. 3, but is also provided with the second placement portion 72, the third placement portion 73, the fourth placement portion 74, and the fifth placement portion 75. The third placement portion 73 is provided extending to the downstream side of the nip point at which the separation roller 31 comes into contact with the separation pad 32. In this way, even if, for example, the separation roller 31 and the conveyance roller 41 are tilted, or if there are variations in a degree of wear, or if there are variations in the nip pressure on the left and right of the separation pad 32 and the pinch roller 42, the position of the sheet can be regulated in the width direction not only before separation by the separation portion 30, but also after separation. Thus, skewing of the sheet that occurs after separation by the separation portion 30 can be effectively suppressed.

As shown in FIG. 3 and FIG. 5, in addition to the first placement portion 71, the second placement portion 72, and the third placement portion 73, the placement portion 61 of the sheet guide 21 is also provided with the fourth placement portion 74 and the fifth placement portion 75. A leading end portion of the fifth placement portion 75 is provided extending beyond the conveyance portion 40 up to the reading portion 8, and extends, for example, to a point immediately on the upstream side of the reading portion 8, as shown in FIG. 5. With this structure, the sheet after separation by the separation portion 30 can be guided reliably to the reading portion 8 while the position of the sheet in the width direction is regulated. As a result, position alignment can be performed in which the center of the sheet in the width direction is always aligned with the center of the reading portion 8 in the width direction. Thus, the image on the sheet can be accurately read by the reading portion 8.

As shown in FIG. 5, FIG. 7 and FIG. 8, the upper surface regulating portion 101 is provided on the sheet guide 21 and thus the position of the sheet is regulated in the height direction. In the present embodiment, in particular, the feed passage of the sheet bends up and down and therefore when a sheet with high rigidity is used, it is possible that the sheet may spring up from the sheet guide 21 and break away from the feed passage. However, as the upper surface regulating portion 101 depresses the upper surface of the springing up sheet, the sheet is guided to the reading portion 8 along the sheet guide 21, while its position in the height direction and its position in the width direction are regulated. In this way, skewing of the sheet after separation is reliably suppressed.

As shown in FIG. 5, the inclined portion 102 that is the input opening of the upper surface regulating portion 101 is positioned on the upstream side of the nip point at which the separation roller 31 comes into contact with the separation pad 32. Further, the inclined portion 102 gradually tilts diagonally upward from the downstream side toward the upstream side in the feed direction of the sheet, with respect to the upper surface of the sheet that is placed on the paper feed tray 11. As a result, the sheet after separation by the separation portion 30 is reliably guided underneath the upper surface regulating portion 101 by the inclined portion 102. The upper surface regulating portion 101 is provided extending as far as the reading portion 8. The position of the sheet in the height direction is therefore regulated by the upper surface regulating portion 101 in the feed passage up to the reading portion 8. Thus, with respect to the reading portion 8, displacement in the position of the sheet in the width direction can be reliably suppressed.

As explained above, the multifunction machine 1 of the present embodiment is provided with the image reading device 3. The image reading device 3 is provided with the ADF 10 that feeds the sheet to the reading portion 8. The ADF 10 is provided with the sheet guides 21 and 22 that regulate the position, in the width direction, of the sheet placed on the paper feed tray 11. The sheet guides 21 and 22 can be moved in the width direction on the paper feed tray 11. The sheet guides 21 and 22 extend at least further to the downstream side, in the feed direction of the sheet, than the separation portion 30. In this way, in the feed passage of the sheet, and particularly even within a narrow space that is further on the downstream side than the separation portion 30, the position of the sheet can be regulated in the width direction. Thus, skewing of the sheet that occurs after separation by the separation portion 30 can be reliably suppressed.

Assembly errors and so on, such as tilting of the separation roller 31 and the conveyance roller 41, variations in a degree of wear, or variations in the nip pressure on the left and right of the separation pad 32 and the pinch roller 42, can be factors that cause skewing, even if the error is slight. In the present embodiment, even if such an assembly error occurs, skewing after separation can be suppressed by the guiding function of the sheet guides 21 and 22. Thus, for example, frequent exchange or fine tuning etc. of the separation roller 31, the separation pad 32, and the conveyance roller 41 and so on is not necessary. As a result, an assembly operation and a maintenance operation are both easily performed.

In the present embodiment, in particular, the sheet guides 21 and 22 come into contact with the upper surface of the sheet that is placed on the paper feed tray 11, and the sheet guides 21 and 22 are provided with the upper surface regulating portion 101 that regulates the position of the sheet in the height direction. In this way, even if the sheet springs up due to stiffness of the sheet, the upper surface regulating portion 101 regulates the position of the sheet in the height direction. As a result, the sheet does not break away from the guides 21 and 22, and the position of the sheet after separation by the separation portion 30 is reliably regulated in the width direction.

In the present embodiment, in particular, the feed passage along which the sheet is fed bends with respect to the feed direction. The sheet guides 21 and 22 bend along the curved shape of the feed passage. Thus, the multifunction machine 1 can have a compact structure in the feed direction of the sheet.

In the present embodiment, in particular, the upper surface regulating portion 101 may be provided such that it extends from further on the upstream side, in the feed direction, than the nip point at which the separation portion 30 separates the sheet, as far as the downstream side end portion. Thus, the position of the sheet in the height direction is regulated from immediately following separation at the nip point of the separation portion 30.

In the present embodiment, in particular, the upper surface regulating portion 101 has the surface that is parallel to the upper surface of the sheet that is being guided by the sheet guides 21 and 22. Therefore, the sheet being guided by the sheet guides 21 and 22 can be favorably guided while its position in the height direction is regulated by coming into contact with the upper surface regulating portion 101. Further, the inclined portion 102 is provided on the end portion of the upper surface regulating portion 101 on the upstream side in the feed direction of the sheet. The inclined portion 102 is provided such that it extends diagonally upward from the downstream side toward the upstream side in the feed direction of the sheet, with respect to the upper surface of the sheet. Thus, the sheet that is separated at the nip point is reliably guided underneath the upper surface regulating portion 101.

In the present embodiment, in particular, the upper surface regulating portion 101 regulates the position in the height direction of the sheet to the height that allows feeding of one sheet. Thus, the sheets are favorably guided one at a time along the sheet guides 21 and 22.

The present disclosure is not limited to the above-described embodiment, and various modifications are possible. For example, in the above-described embodiment, an explanation is given taking the sheet that is the paper medium as an example, but the material is not limited as long as it is in the shape of a sheet, and may be, for example, a plastic film.

In the above-described embodiment, the sheet guides 21 and 22 are provided extending from the paper feed tray 11 up to the reading portion 8, but they may be provided such that they extend further to the downstream side than the separation portion 30. Specifically, for example, it is sufficient as long as the sheet guides 21 and 22 are provided at least as far as the third placement portions 73 and 93.

In the above-described embodiment, the explanation is given in which the sheet guides 21 and 22 are mutually linked and move together. However, for example, one of the sheet guides 21 and 22 may be fixed and the other of the sheet guides 21 and 22 only may move.

In the above-described embodiment, the explanation is given with the ADF 10 of the image reading device 3 of the multifunction device 1 as the example of the sheet feeding device. However, as long as it is a device that requires sheets to be fed, the present disclosure can be applied to another device. For example, the present disclosure may be applied to a sheet feeding device that simply feeds sheets. Further, for example, the present disclosure may be applied to a sheet feed type image reading device that is not provided with an image forming portion.

In the above-described embodiment, the ADF 10 is provided with the one separation portion 30, but a plurality of the separation portions 30 may be provided in the width direction. In this case, the ADF can further reduce the possibility of skewing of the sheet occurring after separation.

In the above-described embodiment, the leading end portion of the fifth placement portion 75 is provided extending beyond the conveyance portion 40 as far as immediately on the upstream side from the reading portion 8. However, the present disclosure is not limited to this example, and the leading end portion of the fifth placement portion may extend, for example, as far as the downstream side of the reading portion 8.

What is claimed is:

1. A sheet feeding device configured to feed sheets, the sheet feeding device comprising:
    a tray configured to receive the sheets;
    a separation portion configured to separate the sheets one by one; and
    a guide portion configured to guide feeding of the sheets while regulating a position of the sheets in a width direction that is orthogonal to a feed direction of the sheets, the guide portion comprising:
        an upstream side end portion, in the feed direction of the sheets, which is disposed above the tray,
        a downstream side end portion, in the feed direction, which extends further to a downstream side, in the feed direction, than the separation portion,
        a placement portion which extends, in the feed direction, continuously from the upstream side to the downstream side and beyond a nip point of a roller included in the separation portion,
        an upper surface regulating portion which extends alongside the placement portion and continuously from the upstream side to the downstream side of the nip point, a height of the upper surface regulating portion, relative to the placement portion, being lower than a shaft of a conveyance roller that is provided on the downstream side of the separation portion and provided on a side where the upper surface regulating portion is provided; and
        a wall portion which extends, in the feed direction, continuously from the upstream side to the downstream side, in the feed direction, and beyond the nip point,
        wherein the upper surface regulating portion is configured to come into contact with an upper surface of the sheets received by the tray, the upper surface of the sheets being opposite to a side of the sheet facing the tray, wherein the upper surface regulating portion is further configured to regulate a position of the sheet in a height direction orthogonal to the upper surface of the sheets, and
        wherein the upper surface regulating portion is configured to regulate the position of the sheets in the height direction to a height that allows feeding of one of the sheets.

2. The sheet feeding device according to claim 1, wherein the guide portion curves along a curved shape of a feed passage which is formed to curve with respect to the feed direction.

3. The sheet feeding device according to claim 1, wherein the upper surface regulating portion further extends to the downstream side end portion of the guide portion.

4. The sheet feeding device according to claim 3, wherein the upper surface regulating portion has a surface that is parallel to the upper surface of the sheets that is guided by the guide portion, and
    an end portion of the upper surface regulating portion on the upstream side in the feed direction comprises:
        an inclined portion that extends, with respect to the upper surface of the sheets, diagonally upward toward the upstream side in the feed direction from the downstream side in the feed direction.

5. An image reading device comprising:
the sheet feeding device according to claim 1; and
a reading portion configured to read an image on the sheets that are fed by the sheet feeding device.

6. The image reading device according to claim 5, wherein the downstream side end portion of the guide portion extends as far as the reading portion.

7. An image forming device comprising:
the image reading device according to claim 5; and
an image forming portion configured to perform image forming onto a recording medium, based on the image read by the reading portion.

8. The sheet feeding device according to claim 1, wherein the placement portion of the guide portion extends continuously from the upstream side to the downstream side of the separation portion and is bent.

9. The sheet feed device according to claim 1, wherein the upper surface regulating portion extends parallel to the placement portion.

* * * * *